United States Patent [19]

McAskill

[11] Patent Number: 5,063,793
[45] Date of Patent: Nov. 12, 1991

[54] SPEED FORWARD, 12 SPEED REVERSE POWERSHIFT TRANSMISSION

[75] Inventor: John P. McAskill, Coffeyville, Kans.

[73] Assignee: Deere & Company, Moline, Ill.

[21] Appl. No.: 578,705

[22] Filed: Sep. 6, 1990

[51] Int. Cl.⁵ .............................................. F16H 3/08
[52] U.S. Cl. .......................................... 74/360; 74/331
[58] Field of Search ...................... 475/198, 200, 207; 74/331, 333, 360

[56] References Cited

U.S. PATENT DOCUMENTS

| | | | |
|---|---|---|---|
| 3,102,432 | 9/1963 | Gerst | 74/360 X |
| 3,181,385 | 5/1965 | Siler | 74/360 X |
| 3,318,167 | 5/1967 | Frost | 74/331 |
| 3,675,508 | 7/1972 | Blank | 74/360 X |
| 3,916,710 | 11/1975 | Sisson et al. | 74/331 |
| 4,392,391 | 7/1983 | Jameson et al. | 74/333 |
| 4,549,443 | 10/1985 | White | 74/360 |
| 4,589,295 | 5/1986 | Jerry et al. | 74/331 X |

Primary Examiner—Allan D. Hermann
Assistant Examiner—Ryan W. Massey

[57] ABSTRACT

The present invention provides a 24 forward speed, 12 reverse speed transmission for use in a work vehicle, e.g., an agricultural or industrial tractor. The transmission uses 10 clutches, with six arranged in a speed section and four in a range section. The speed section arrangement can provide six forward and three reverse speeds, while the range section can provide four ranges. Optionally, the transmission may be provided with a selectively engageable power take-off shaft and a selectively engageable front wheel drive take-off. The entire structure provides a very small speed change requirement between the diffrent gear ratios.

8 Claims, 4 Drawing Sheets

SPEED FORWARD, 12 SPEED REVERSE POWERSHIFT TRANSMISSION

BACKGROUND OF THE INVENTION

1. Field of the Invention

The present invention relates to gearset transmissions, and particularly large gearset transmissions with a wide variety of speeds suitable for use in work vehicles such as agricultural and industrial equipment.

2. Description of the Related Art

There are a great many powershift transmissions known having a large variety of speeds. Such variety of speeds is particularly useful for large vehicles, and especially work vehicles such as agricultural and industrial tractors. Such vehicles may need a dozen or more speeds in a very small range, e.g., 0.5 to 5 kilometers per hour, and just a few at higher speeds, e.g., up to 40 kilometers per hour.

Such vehicles typically have a large mass, or are under a significant load (for example, plowing), so that the change in energy levels between the rotating components of the transmission should be held to a minimum between any two successive speeds. This is necessary to minimize the time required for a shift, thereby allowing a smoother shift and preventing the vehicle from coming to a lurching halt. At the same time, the transmission size must also be held to a minimum in order to fit into an existing vehicle.

Funk Manufacturing currently produces a powershift transmission for Ford/New Holland row crop tractors which provides 18 forward speeds and 9 reverse speeds. To do this, nine clutches and attendant gears are arranged with six clutches in a speed section and three clutches in a range section. The six clutches in the speed section can provide nine useable gear ratios, while the three clutches in the range section provide two forward ranges and one reverse range.

While at first it might appear that nine additional speeds could be provided simply by adding another forward range, this is not practical in reality. First, there is the simple limitation of space. Second, and more important, the necessary readjustments to the gear ratios of the speed gears required so that the bulk of these ranges will still be in the desired, limited range of, e.g., 0.5 to 5 kilometers per hour, would produce a very undesirable range of reverse speeds. In addition, the momentum which must be changed upon shifting from one of these ranges to another would be undesirably high.

SUMMARY OF THE INVENTION

Accordingly, it is an object of the present invention to provide a full powershift transmission for a work vehicle capable of providing 24 forward speeds and 12 reverse speeds.

This object of the invention is accomplished by providing a design using 10 clutches, with six clutches in a speed section and four clutches in a range section. The clutches and gears in the speed section are arranged to produce six forward speeds and three reverse speeds, so that reverse becomes a speed rather than a range. The four clutches in the range section provide four ranges, resulting in 24 forward speeds and 12 reverse speeds.

With the new design, a range shift is made every six shifts instead of every nine shifts, as would be provided in a modified version of the prior transmission. The six additional speeds then are useable to reduce the speed change between gear steps, reducing the required changes in the speeds of the rotating components during shifts. This decreases the time required for shift and allows smoother shifting.

Preferably, the transmission also provides direct engine power to an optionally engageable power take-off shaft, and modified power to a second output shaft, e.g., to drive the forward wheels of a four-wheel drive vehicle.

DETAILED DESCRIPTION OF THE PREFERRED EMBODIMENTS

Figures 1, 2:
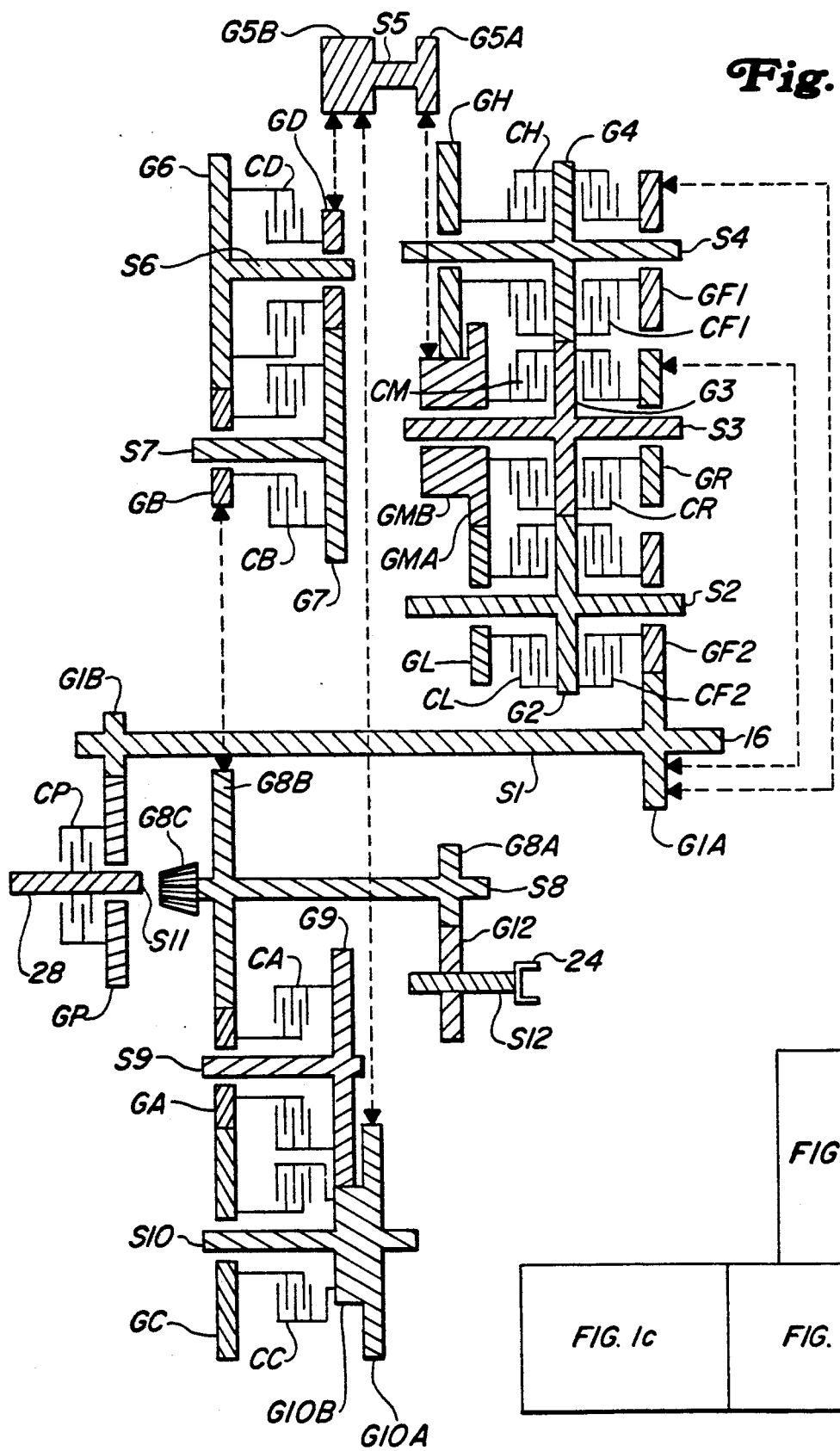
FIG. 1 schematically illustrates the layout of FIGS. 1a, 1b and 1c, which collectively will be referred to hereinafter as "FIG. 1", and is a cross-section of a transmission according to the present invention.
FIG. 2 is a schematic representation of the transmission of FIG. 1.
Figure 1A:
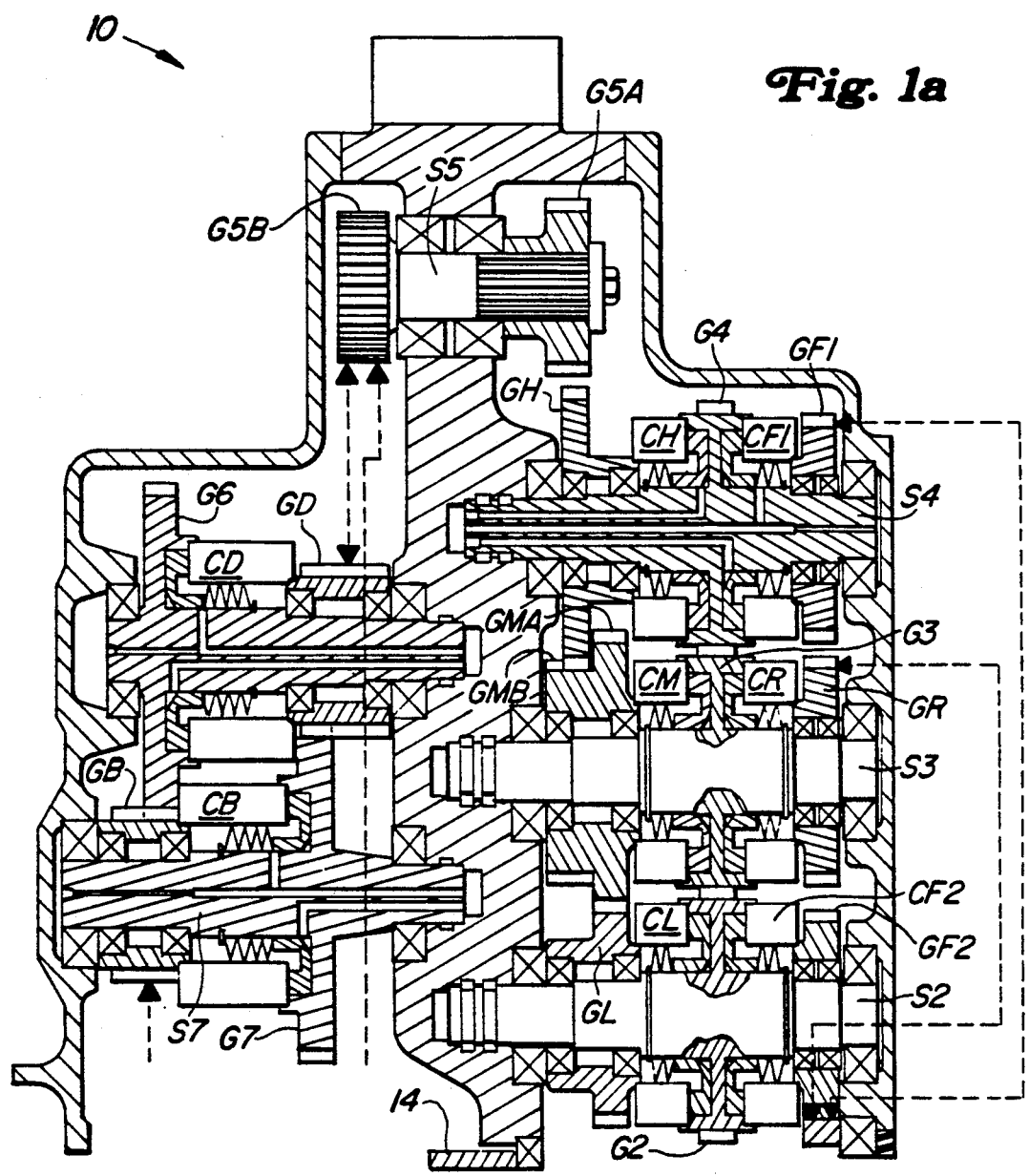
Figure 1B:
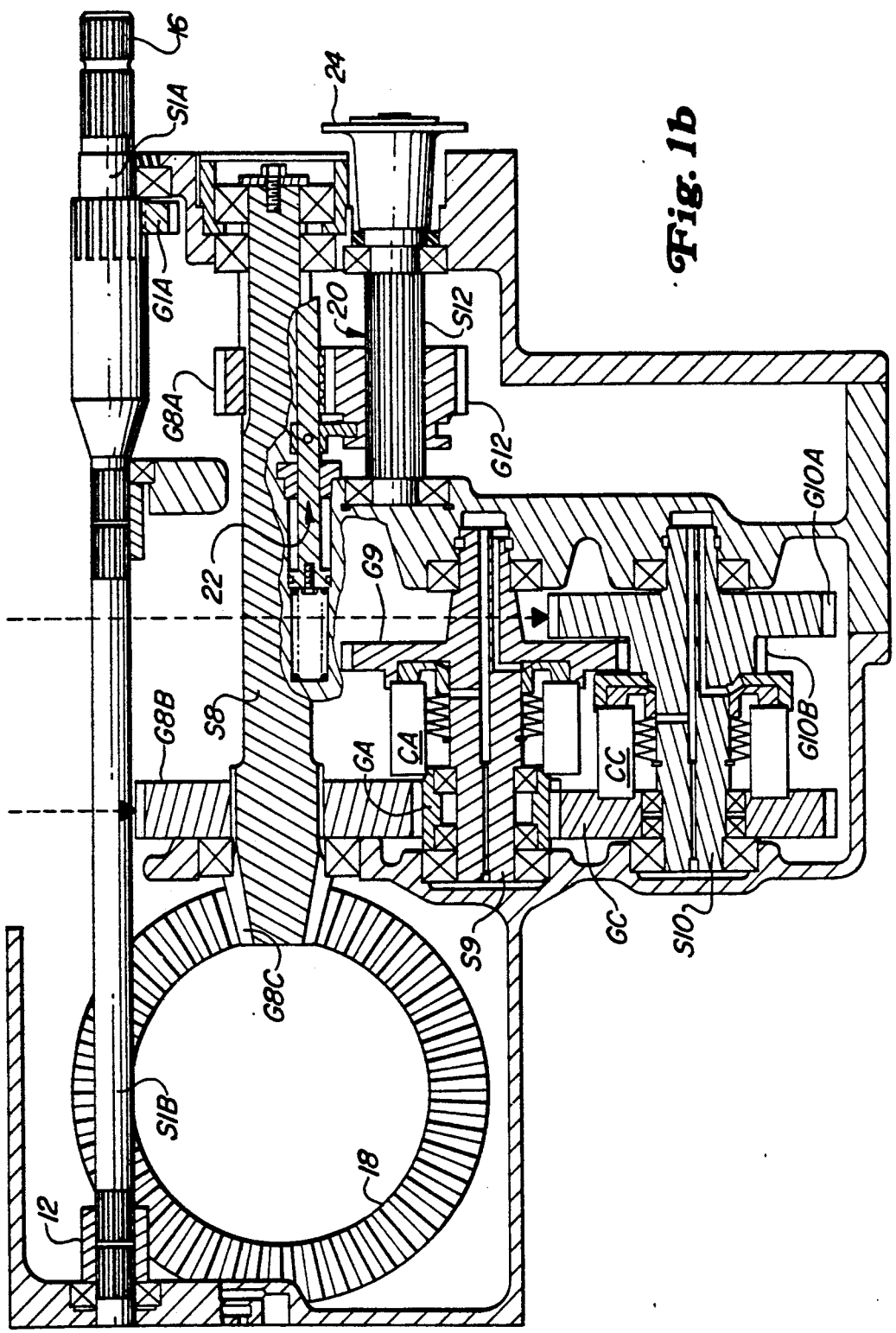
Figure 1C:
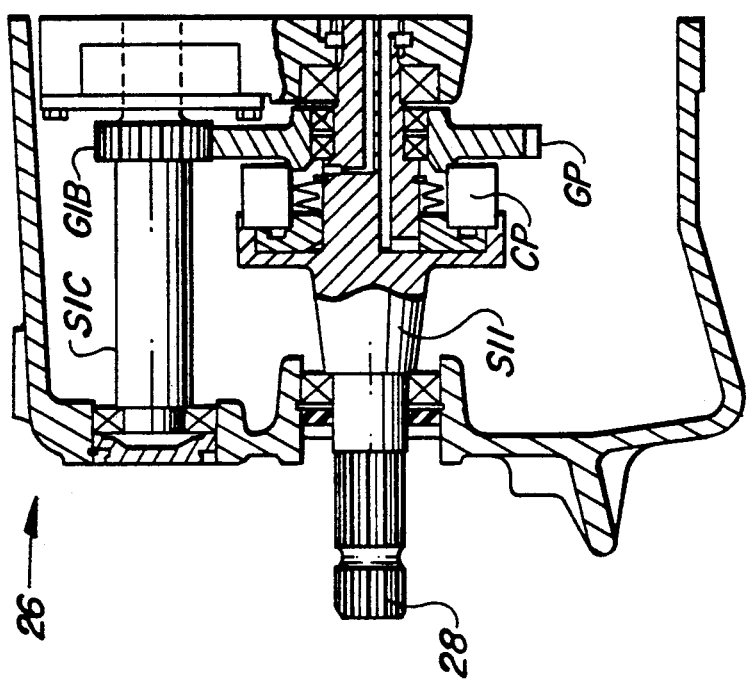

For clarity in the following description, reference numerals for shafts all begin with S, reference numerals for gears all begin with G and reference numerals for clutches all begin with C. For further clarity, the remainder of the reference numerals for a clutch and the corresponding gear are the same, e.g., clutch CR engages gear GR. Finally, remaining gears use nomenclature indicating upon which shaft they are mounted, e.g., gear G2 is mounted on shaft S2, and multiple gears mounted to a given shaft are indicated by alphabetic letters, e.g., gears G5A and G5B are both mounted to shaft S5.

Turning to FIG. 1, a housing 10 has a plurality of shafts, clutches, and gears rotatably mounted therein. Input shaft S1 is shown as having been made (for manufacturing convenience) in three parts S1A, S1B, S1C. These three parts are rotatably mounted in the housing 10 coaxially, and are fixed for rotation together by sleeves 12, 14. They will collectively be referred to hereinafter as shaft S1.

Shaft S1 has an input coupler 16 at one end thereof for receiving input motive power from a prime mover (not shown), e.g., a vehicle engine. Gear G1A is fixed for rotation with shaft S1.

Shaft S2 is rotatably mounted in the housing laterally adjacent to shaft S1, and has gear G2 fixed for rotation therewith. Shaft S2 also carries gears GL, GF2, which are rotatably mounted about shaft S2. Clutches CL, CF2 also are mounted around shaft S2 and can engage gears GL, GF2, respectively, to fix the gears for rotation with shaft S2. Gear GF2 continuously meshes with gear G1A.

Shaft S3 is rotatably mounted in housing 10 laterally adjacent to shafts S1, S2, and carries gear G3 fixed for rotation with shaft S3. Shaft S3 also carries gears GMA, GMB, GR which are rotatably mounted about the shaft S3. Gears GMA, GMB preferably are formed as a double gear, as shown. Shaft S3 further carries clutch CM, which can engage gears GMA, GMB, and clutch CR, which can engage gear GR, to fix them for rotation with shaft S3. Gears GR G3 GMA mesh continuously with gears G1A, G2, GL, respectively.

Shaft S4 is rotatably mounted in the housing 10 laterally adjacent to shafts S1, S3, and carries gear G4 fixed for rotation with the shaft S4. Shaft S4 also carries gears GH, GF1, which are rotatably mounted about shaft S4. Shaft S4 further carries clutches CH, CF1 which are engageable with gears GH, GF1, respectively, to fix the gears for rotation with the shaft S4. Gears GH, G4, GF1 mesh continuously with gears GMB, G3, G1A, respectively.

Shaft S5 is rotatably mounted in the housing 10 laterally adjacent to shaft S3, and carries gears G5A, G5B fixed for rotation therewith. Gear G5A meshes continuously with gear GMB.

Shaft S6 is rotatably mounted in the housing 10 laterally adjacent to shaft S5, and carries gear G6 fixed for rotation therewith. Shaft S6 also carries gear GD, which is rotatable about shaft S6. Clutch CD is mounted about shaft S6, and is engageable with gear GD to fix the gear for rotation with shaft S6. Gear GD meshes continuously with gear G5B.

Shaft S7 is rotatably mounted in the housing 10 laterally adjacent to shaft S6, and carries gear G7 fixed for rotation therewith. Gear GB is rotatably mounted about shaft S7. Clutch CB is carried by shaft S7 and is engageable with gear GB to fix the gear for rotation with the shaft S7. Gears GB, G7 mesh continuously with gears G6, GD, respectively.

Output shaft S8 is rotatably mounted in the housing 10 laterally adjacent to shaft S7, and carries gears G8B, G8C fixed for rotation therewith. Gear G8C preferably is a conical gear, and provides output motive power, e.g., by engaging the ring gear 18 of a differential for driving the wheels of the vehicle in which the transmission is used. Gear with GB.

Shaft S9 is rotatably mounted in the housing 10 laterally adjacent to shaft S8 and carries gear G9 fixed for rotation therewith. Gear GA is rotatably mounted about shaft S9. Clutch CA also is carried by shaft S9 and can engage gear GA to fix the gear for rotation with the shaft S9. Gear GA meshes continuously with gear G8B.

Shaft S10 is rotatably mounted in the housing 10 laterally adjacent to shafts S5, S9, and carries gears G10A, G10B fixed for rotation therewith. Gear GC also is rotatably mounted about shaft S10. Clutch CC is engageable with gear GC to fix the gear for rotation with shaft S10. Gears GC, G10B, G10A mesh continuously with gears GA, G9, G5B, respectively.

As will be apparent from the drawing, shafts S2, S3, S4 are of substantially the same size and configuration, and are positioned in a first group with their ends largely in common planes. Similarly, shafts S6, S7, S9, S10 are very similar in structure and are positioned in a second group largely with their ends in common planes. These groups of shafts then are positioned in longitudinally adjacent to each other, with the gears on shaft S5 serving to transmit power from one the gears in one group of shafts to the other.

A selectively engageable power take off (PTO) shaft may be provided, if desired. To do this, an additional gear G1B is fixed for rotation with the shaft S1. Shaft S11 is rotatably mounted in the housing 10 adjacent to the end of shaft S1 opposite from the input coupler 16. Gear GP is rotatably mounted about shaft S11. Shaft S11 also carries clutch CP, which is engageable with gear GP to fix the gear for rotation with shaft S11. Gear GP continuously meshes with gear G1B. Finally, the shaft S11 carries a PTO coupler 28 at one end thereof.

Similarly, an additional output shaft may be provided, e.g., for front wheel drive on a four-wheel drive vehicle. An additional gear G8A is fixed for rotation with shaft S8. Shaft S12 is positioned laterally adjacent to shaft S8. Gear G12 is mounted to shaft S12 by splines 20, which allow the gear to slide along shaft S12, but fix it for rotation with the shaft. Gear G12 is movable between a first position meshing with gear G8A and a second position disengaged from gear G8A. A shift mechanism 22, including the usual shift fork, cam rods, etc., is provided to move the gear G12 along the shaft S12, into and out of engagement with the gear G8C. Such shift mechanisms are well known to one of ordinary skill e.g., for providing power to the front wheels of a 4-wheel drive tractor.

Numerous bearings and oil passages for operating the various clutches are illustrated in the drawings. Such bearings and control mechanisms are well known to one of ordinary skill in the art, and have been omitted for clarity in many of the shafts. It is to be understood that they would be provided in the usual fashion.

FIG. 2 is a schematic representation of a transmission shown in FIG. 1. Due to the "unwrapping" all of the transmission in the cross-section taken in FIG. 1, not all of the gears are shown meshing with the gears with which they actually mesh. Any such situation is shown in the schematic by the use of dashed lines.

In a preferred embodiment, the gears shown in the drawing have the number of teeth on each gear shown in Table 1:

TABLE 1

| Gear | Tooth Count |
| --- | --- |
| GA | 40 |
| GB | 40 |
| GC | 81 |
| GD | 40 |
| GH | 67 |
| GMA | 67 |
| GMB | 53 |
| GL | 53 |
| GF1 | 54 |
| GF2 | 48 |
| GR | 54 |
| GP | 71 |
| G1A | 39 |
| G1B | 22 |
| G2 | 60 |
| G3 | 60 |
| G4 | 60 |
| G5A | 41 |
| G5B | 35 |
| G6 | 81 |
| G7 | 81 |
| G8A | 32 |
| G8B | 80 |
| G9 | 81 |
| G10A | 81 |
| G10B | 40 |
| G12 | 38 |

OPERATION

It is believed that the method of operation of the present invention will be readily apparent to one of ordinary skill in the art from the foregoing description.

Generally, a range A, B, C, D is chosen by activation of one of clutches CA, CB, CC, CD. A direction and speed then is chosen by activating one of clutches CF1, CF2, CR and one of clutches CL, CM, CH. Various combinations of these activations can provide 24 forward speeds and 12 reverse speeds.

In particular, the clutches can be engaged as shown in Tables 2A and 2B. If gears having the teeth counts shown in Table 1 are used, the resulting gear ratios will be those shown in Tables 2A and 2B.

TABLE 2A

| Gear | CA | CB | CC | CD | CH | CM | CL | CF1 | CF2 | CR | Ratio |
|------|----|----|----|----|----|----|----|-----|-----|----|-------|
| F1  | X |   |   |   |   |   | X | X |   |   | 12.691 |
| F2  | X |   |   |   |   |   | X |   | X |   | 11.281 |
| F3  | X |   |   |   | X |   |   | X |   |   | 10.039 |
| F4  | X |   |   |   | X |   |   |   | X |   | 8.924 |
| F5  | X |   |   | X |   |   |   | X |   |   | 7.942 |
| F6  | X |   |   | X |   |   |   |   | X |   | 7.059 |
| F7  |   | X |   |   |   |   | X | X |   |   | 6.267 |
| F8  |   | X |   |   |   |   | X |   | X |   | 5.571 |
| F9  |   | X |   |   | X |   |   | X |   |   | 4.958 |
| F10 |   | X |   |   | X |   |   |   | X |   | 4.407 |
| F11 |   | X |   | X |   |   |   | X |   |   | 3.922 |
| F12 |   | X |   | X |   |   |   |   | X |   | 3.486 |
| F13 |   |   | X |   |   |   | X | X |   |   | 3.095 |
| F14 |   |   | X |   |   |   | X |   | X |   | 2.751 |
| F15 |   |   | X |   | X |   |   | X |   |   | 2.448 |
| F16 |   |   | X |   | X |   |   |   | X |   | 2.176 |
| F17 |   |   | X | X |   |   |   | X |   |   | 1.937 |
| F18 |   |   | X | X |   |   |   |   | X |   | 1.722 |
| F19 |   |   |   | X |   |   | X | X |   |   | 1.528 |
| F20 |   |   |   | X |   |   | X |   | X |   | 1.359 |
| F21 |   |   |   | X | X |   |   | X |   |   | 1.209 |
| F22 |   |   |   | X | X |   |   |   | X |   | 1.075 |
| F23 |   |   |   | X |   | X |   | X |   |   | 0.956 |
| F24 |   |   |   | X |   | X |   |   | X |   | 0.850 |

TABLE 2B

| Gear | CA | CB | CC | CD | CH | CM | CL | CF1 | CF2 | CR | Ratio |
|------|----|----|----|----|----|----|----|-----|-----|----|-------|
| R1  | X |   |   |   |   |   | X |   |   | X | −12.691 |
| R2  | X |   |   |   | X |   |   |   |   | X | −10.039 |
| R3  | X |   |   | X |   |   |   |   |   | X | −7.942 |
| R4  |   | X |   |   |   |   | X |   |   | X | −6.267 |
| R5  |   | X |   |   | X |   |   |   |   | X | −4.958 |
| R6  |   | X |   | X |   |   |   |   |   | X | −3.922 |
| R7  |   |   | X |   |   |   | X |   |   | X | −3.095 |
| R8  |   |   | X |   | X |   |   |   |   | X | −2.448 |
| R9  |   |   | X | X |   |   |   |   |   | X | −1.937 |
| R10 |   |   |   | X |   |   | X |   |   | X | −1.528 |
| R11 |   |   |   | X | X |   |   |   |   | X | −1.209 |
| R12 |   |   |   | X |   | X |   |   |   | X | −0.956 |

Various modifications may easily be made to the present invention by one of ordinary skill in the art. For example, if a PTO output is not desired, the entire portion 26 of the housing 10 containing shafts S1C, S11, clutch CP and gears G1B, GP may be omitted. Similarly, if front wheel drive is not desired, shaft S12 and its attendant components may be omitted. Alternatively, if permanent front wheel drive is desired, G12 can be fixed in a position engaging meshing continuously with gear G8A, and the shift mechanism 22 can be omitted.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A transmission comprising:
   a. a housing;
   b. a first input shaft rotatably mounted in said housing and having at least one end adapted to receive input motive power;
   c. a first gear fixed for rotation with said first shaft;
   d. a second shaft rotatably mounted in said housing adjacent to said first shaft;
   e. second and third gears rotatably mounted about said second shaft and a fourth gear fixed for rotation with said second shaft, said second gear meshing continuously with said first gear;
   f. first and second clutches mounted about said second shaft and engageable with said second and third gears, respectively, to selectively fix said gears for rotation with said second shaft;
   g. a third shaft rotatably mounted in said housing adjacent to said first and second shafts;
   h. fifth, sixth and seventh gears rotatably mounted about said third shaft and an eighth gear fixed for rotation with said third shaft, said fifth gear meshing continuously with said first gear, said sixth gear meshing continuously with said third gear, and said eighth gear meshing continuously with said fourth gear;
   i. third and fourth clutches mounted about said third shaft, said third clutch being engageable with said fifth gear and said fourth clutch being engageable with said sixth and seventh gears to selectively fix said gears for rotation with said third shaft;
   j. a fourth shaft rotatably mounted in said housing adjacent to said first and third shafts;
   k. ninth and tenth gears rotatably mounted about said fourth shaft and an eleventh gear fixed for rotation with said fourth shaft, said ninth, tenth and eleventh gears meshing continuously with said first, seventh and eighth gears, respectively;

l. fifth and sixth clutches mounted about said fourth shaft and engageable with said ninth and tenth gears, respectively, to selectively fix said gears for rotation with said fourth shaft;

m. a fifth shaft rotatably mounted in said housing adjacent to said third shaft;

n. twelfth and thirteenth gears fixed for rotation with said fifth shaft, said twelfth gear meshing continuously with said seventh gear;

o. a sixth shaft rotatably mounted in said housing adjacent to said fifth shaft;

p. a fourteenth gear rotatably mounted about said sixth shaft and a fifteenth gear fixed for rotation with said sixth shaft, said fourteenth gear meshing continuously with said thirteenth gear;

q. a seventh clutch mounted about said sixth shaft and engageable with said fourteenth gear to selectively fix said gear for rotation with said sixth shaft;

r. a seventh shaft rotatably mounted in said housing adjacent to said sixth shaft;

s. a sixteenth gear fixed for rotation with said seventh shaft and a seventeenth gear rotatably mounted about said seventh shaft, said sixteenth and seventeenth gears meshing continuously with said fourteenth and fifteenth gears, respectively;

t. an eighth clutch mounted about said seventh shaft and engageable with said seventeenth gear to selectively fix said gear for rotation with said seventh shaft;

u. an eighth shaft rotatably mounted in said housing seventh shaft;

v. eighteenth and nineteenth gears fixed for rotation with said eighth shaft, said eighteenth gear meshing continuously with said seventeenth gear and said nineteenth gear providing output motive power;

w. a ninth shaft rotatably mounted in said housing adjacent to said eight shaft;

x. a twentieth gear fixed for rotation with said ninth shaft and a twenty-first gear rotatably mounted about said ninth shaft, said twenty-first gear meshing continuously with said eighteenth gear;

y. a ninth clutch mounted about said ninth shaft and engageable with said twenty-first gear to selectively fix said gear for rotation with said ninth shaft;

z. a tenth shaft rotatably mounted in said housing adjacent to said ninth shaft;

aa. twenty-second and twenty-third gears fixed for rotation with said tenth shaft and a twenty-fourth gear rotatably mounted about said ninth shaft, said twenty-second, twenty-third and twenty-fourth gears meshing continuously with said thirteenth, twentieth and twenty-first gears, respectively; and ab. a tenth clutch mounted about said tenth shaft and engageable with said twenty-fourth gear to selectively fix said gear for rotation with said tenth shaft.

2. The transmission of claim 1, further comprising:

a. a twenty-fifth gear fixed for rotation with said first shaft;

b. an eleventh shaft rotatably mounted in said housing adjacent to said first shaft;

c. a twenty-sixth gear rotatably mounted about said eleventh shaft and a power take-off coupler fixed for rotation with said eleventh shaft, said twenty-sixth gear meshing continuously with said twenty-fifth gear;

d. an eleventh clutch mounted about said eleventh shaft and engageable with said twenty-sixth gear to selectively fix said gear for rotation with said eleventh shaft.

3. The transmission of claim 1, further comprising:

a. a twenty-seventh gear fixed for rotation with said eight shaft;

b. a twelfth shaft rotatably mounted in said housing adjacent to said eighth shaft;

c. a twenty-eighth gear and an output coupler fixed for rotation with said twelfth shaft, said twenty-eighth gear being slidable along said twelfth shaft between a first position meshing with said twenty-seventh gear and a second position disengaged from said twenty-seventh gear.

4. The transmission of claim 3, further comprising a shift mechanism for selectively moving said twenty-eight gear between said first and second positions.

5. The transmission of claim 1, wherein said sixth and seventh gears are formed as a double gear.

6. The transmission of claim 1, wherein said twenty-second and twenty-third gears are formed as a double gear.

7. The transmission of claim 1, wherein said second, third and fourth shafts are positioned laterally adjacent to one another in a first group of shafts, said sixth, seventh, ninth and tenth shafts are positioned laterally adjacent to one another in a second group of shafts, and said first and second groups of shafts are positioned longitudinally adjacent each other.

8. The transmission of claim 7, wherein said fifth shaft is positioned to extend between said first and second groups of shafts.

* * * * *

UNITED STATES PATENT AND TRADEMARK OFFICE
CERTIFICATE OF CORRECTION

PATENT NO. : 5,063,793
DATED : 12 November 1991
INVENTOR(S) : John Pearce McAskill It is certified that error appears in the above-identified patent and that said Letters Patent is hereby corrected as shown below:

Title page, item [54], and col. 1, line 1, before "SPEED" (1st occurrence), insert -- 24 --.

In Column 7, line 31, before "seventh", insert -- adjacent to said --.

Signed and Sealed this

First Day of June, 1993

Attest:

MICHAEL K. KIRK

*Attesting Officer*     *Acting Commissioner of Patents and Trademarks*